United States Patent [19]

Yanabu et al.

[11] 4,172,268

[45] Oct. 23, 1979

[54] DIRECT CURRENT CIRCUIT INTERRUPTING APPARATUS

[75] Inventors: Satoru Yanabu; Susumu Nishiwaki, both of Yokohama, Japan

[73] Assignee: Tokyo Shibaura Denki Kabushiki Kaisha, Kawasaki, Japan

[21] Appl. No.: 837,092

[22] Filed: Sep. 28, 1977

[30] Foreign Application Priority Data

Sep. 30, 1976 [JP] Japan ............................ 51-116535

[51] Int. Cl.[2] ............................................ H02H 7/22

[52] U.S. Cl. ............................................ 361/4; 361/6; 361/8; 307/134

[58] Field of Search ......................... 361/4, 2, 6, 7, 13, 361/14, 15, 16, 8; 307/134, 135, 137, 125, 126; 200/144 R, 144 B, 145, 146, 146 AA

[56] References Cited

U.S. PATENT DOCUMENTS

| | | | |
|---|---|---|---|
| 2,942,152 | 6/1960 | Stoelting | 361/16 |
| 3,454,832 | 7/1969 | Hurtle | 361/13 X |
| 3,476,978 | 11/1969 | Greenwood | 361/4 |
| 3,515,940 | 6/1970 | Hobson, Jr. | 361/13 |
| 3,708,718 | 1/1973 | Hoffmann et al. | 361/4 |
| 3,805,114 | 4/1974 | Matsuoka et al. | 361/128 |
| 3,806,765 | 4/1974 | Matsuoka et al. | 361/128 |
| 4,056,836 | 11/1977 | Knauer | 361/4 |

OTHER PUBLICATIONS

Panel Session on "Prospects for Multiterminal H.V.D.C. Transmission Status of D.C. Interrupting Devices", by G. D. Breuer-G.E. Co. IEEE Power Engr. Society, 1977 Summer Meeting Mexico City.

"Theory and Application of the Commutation Principle for H.V.D.C. Circuit Breakers", by A. N. Greenwood, T. H. Lee; IEEE PAS vol. 91, No. 4, 1972 pp. 1570–1574.

"H.V.D.C. Vacuum Circuit Breakers", by A. N. Greenwood, P. Barkan, W. C. Kracht; IEEE-PAS, vol. 91, No. 4, 1972 pp. 1575–1587.

*Primary Examiner*—Patrick R. Salce

*Attorney, Agent, or Firm*—Stevens, Davis, Miller & Mosher

[57] ABSTRACT

A direct current circuit interrupting apparatus of the type wherein the arc of the circuit interruptor is extinguished by passing an oscillatory current from an oscillating circuit to the interrupted contacts via a switch means which is closed at the time when the circuit interruptor is opened includes a nonlinear resistor comprising a sintered mixture of metal oxides connected in parallel with the oscillating circuit.

9 Claims, 10 Drawing Figures

DIRECT CURRENT CIRCUIT INTERRUPTING APPARATUS

BACKGROUND OF THE INVENTION

This invention relates to DC circuit interrupting apparatus suitable for use in high voltage large capacity DC transmission systems.

In an AC circuit interruptor, electric are struck between separated contacts extinguishes when the current passes through a zero point. However, in the case of a DC circuit interruptor, since there is no zero point in the current and voltage it is necessary to forcibly reduce the current to zero and many devices have been proposed for this purpose.

FIG. 1 shows one example of such device in which a circuit interruptor CB in the form of a vacuum switch or a circuit breaker utilizing an arc extinguishing medium such as $SF_6$, air, oil etc. is connected in series with a DC power line and an oscillating circuit including a capacitor C, a reactor L and a switch S is connected across the circuit interruptor CB. When the circuit breaker CB is opened, switch S is closed to pass the oscillatory discharge current of capacitor C through the electric arc struck between the contacts of the circuit breaker CB thereby forming a zero point in the current to be interrupted.

FIG. 2 shows a portion of a DC transmission system utilizing the circuit interrupting apparatus shown in FIG. 1 in which Tr represents a transformer, Re a rectifier or inverter, Ls a smoothing reactor and F a filter including a capacitor. When the DC current I is interrupted by the high frequency oscillatory discharge current, an energy expressed by $\frac{1}{2}$ LS $I^2$ would be stored in the smoothing reactor Ls where Ls represents the inductance thereof. This energy charges the capacitor of the filter F to an excessively high voltage. To suppress such excessive voltage a DC interrupting apparatus as shown in FIG. 3 has been developed in which R represents a resistor for charging capacitor C, Rs a nonlinear resistance element comprising silicon carbide which is used as the characteristic element of an arrestor, and $TR_1$, $TR_2$ and $TR_3$ trigger gaps, that is, spark gaps provided with trigger electrodes as will be described in detail below. Concurrently, with the opening of the circuit interruptor CB, trigger gap $TG_1$ is caused to discharge for passing the oscillatory discharge current Io through the arc of the circuit interruptor CB to interrupt the current I. The excessive voltage described above triggers the trigger gap $TG_2$ whereby the energy stored in the smoothing reactor is dissipated by the nonlinear resistance element $R_s$ and the excessive voltage is suppressed. Thereafter, DC current corresponding to the voltage of the DC transmission line flows through the trigger gap $TG_2$ and the nonlinear resistance element Rs. When the trigger gap $TG_3$ is triggered after suppression of the excessive voltage, oscillatory discharge current $I_1$ of capacitor C flows through both trigger gaps $TG_2$ and $TG_3$ thus interrupting the current flowing through trigger gap $TG_2$. As the insulating strength of the trigger gap $TG_2$ recovers, the nonlinear resistance element Rs becomes isolated from the transmission line.

Another DC circuit interrupting apparatus as shown in FIG. 4 has also been developed in which a series circuit including a nonlinear resistance element Rs and a circuit breaker $CB_1$ is connected across a DC circuit interruptor CB. When the circuit interruptor CB is opened a high recovering voltage appears across the separated contacts of the circuit interruptor so that the current I to be interrupted is transferred to the nonlinear resistance element $R_s$. The current $I_1$ flowing through the resistance element $R_s$ is smaller than the current I to be interrupted. Thereafter circuit breaker $CB_1$ is opened to interrupt current $I_1$. At this time since current $I_1$ is limited by the resistance element $R_s$, its interruption is easy. When the circuit interrupting apparatus shown in FIG. 4 is used in the DC transmission system shown in FIG. 2, the energy stored in the smoothing reactor LS is dissipated by the arcs of circuit interruptors CB and $CB_1$ and the resistance element 4.

DC current interrupting apparatus are generally connected at both ends of a DC transmission line as shown in FIG. 5 in which $DCCB_1$ and $DCCB_2$ are DC circuit interrupting apparatus, $LS_1$ and $LS_2$ smoothing reactors, $F_1$ and $F_2$ filters, $Re_1$ a rectifier (or inverter) and $Re_2$ an inverter (or rectifier). Where a DC interrupting apparatus as shown in FIG. 3 is used, and where a fault occurs on the transmission line, the excessive voltage caused by the smoothing reactor $LS_1$ would be suppressed by the nonlinear resistance element $R_s$ associated therewith but the excessive voltage caused by the smoothing reactor $LS_2$ on the opposite end could not be suppressed because circuit interruptor $DCCB_2$ would not be opened. On the other hand, when the circuit interrupting apparatus as shown in FIG. 4 is used in a DC transmission line, the energy of both smoothing reactors $LS_1$ and $LS_2$ could be adsorbed. With the construction shown in FIG. 4, however, as it is necessary to use additional circuit breaker $CB_2$ for interrupting the current flowing through the resistance element the construction becomes complicated and expensive.

SUMMARY OF THE INVENTION

Accordingly it is an object of this invention to provide an improved DC interrupting apparatus having a simple construction and the ability to rapidly interrupt a large high voltage direct current.

According to this invention there is provided direct current circuit interrupting apparatus of the type comprising a circuit interruptor, an oscillation circuit including a capacitor and a reactor, switch means for connecting the oscillation circuit across the circuit interruptor when the same is opened, and a resistor for charging the capacitor, characterized in that a nonlinear resistor is connected in parallel with the oscillation circuit and that the nonlinear resistor comprises a sintered mixture of metal oxides.

The metal oxides are selected from the group consisting of ZnO, MgO, CoO, NiO $Sb_2O_3$ and $Bi_2O_3$.

DESCRIPTION OF THE PREFERRED EMBODIMENTS

Figure 6:
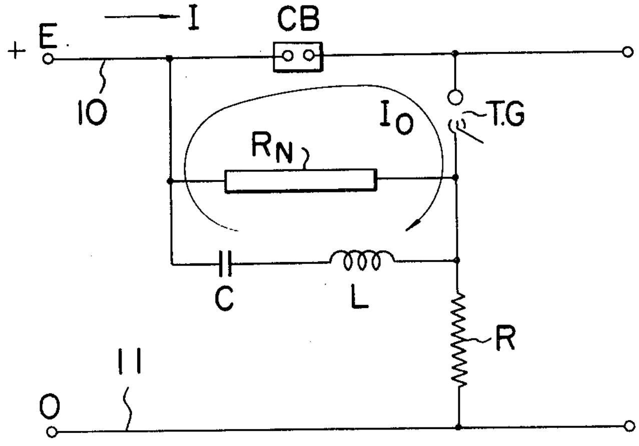
FIG. 6 is a connection diagram showing one embodiment of this invention.

In a preferred embodiment of this invention shown in FIG. 6, a main circuit interruptor CB is connected in series with one conductor 10 of a DC transmission line 1, and a series circuit including a nonlinear resistance element $R_N$ and a trigger gap TG is connected across the main circuit interruptor CB. As is well known in the art a trigger gap is a discharge gap provided with a trigger electrode positioned close to one gap electrode and an arc is struck between gap electrodes by applying a trigger pulse to the trigger electrode. An oscillation circuit comprising a capacitor C and a reactor L is connected across the nonlinear resistance element RN, and a resistor R for charging the capacitor C is connected to the juncture between the reactor L and the trigger gap TG. The other end of resistor R is connected to the other conductor 11 of the transmission line.

Figure 7:
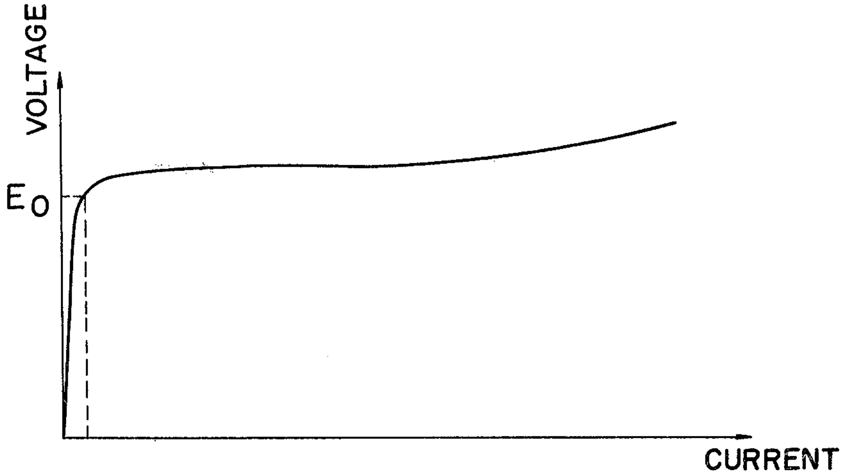
FIG. 7 is a graph showing the voltage-current characteristic of the non-linear resistance element utilized in the embodiment shown in FIG. 6.

The invention is characterized by using a nonlinear resistor comprising a sintered mixture of metal oxides. According to one example, the mixture has a composition consisting of 87 to 12 mole % of ZnO, 12 to 8% mole % of MeO (where MeO represents at least one of MgO, CoO and NiO), 1 to 30 mole % of $Sb_2O_3$ and 0.5 to 10%, by weight of $Bi_2O_3$. According to another example, the mixture has a composition consisting of 0.08 to 4.0 mole % of $Bi_2O_3$, 0.05 to 4.5 mole % of CoO, 0.07 to 5.0 mole % of MnO, 0.05 to 6.0 mole % of $Sb_2O_3$ and the remainder of ZnO. Many other similar metal oxide non-linear resistors are well known in the art. Such nonlinear resistor has a voltage-current characteristic as shown in FIG. 7. As shown, the resistor has a remarkable nonlinear or negative resistance characteristic so that as voltage across the resistor exceeds a critical value $E_o$ the current increases greatly but so long as the line voltage E is lower than the critical value $E_o$ it passes current of negligible value of the order of milliamperes. Moreover, the resistor RN is not damaged thermally even when a normal DC voltage E which is slightly lower than the critical value $E_o$ is constantly applied. For this reason the resistor $R_N$ would not be thermally damaged even though it is connected in parallel with capacitor C which is charged to the line voltage E through resistor R. Although the charge of the capacitor C normally discharges through resistor $R_N$, such discharge current is small because the line voltage E is selected to be lower than the critical voltage $E_o$ and supplemented by the charging current through resistor R.

Figure 1:
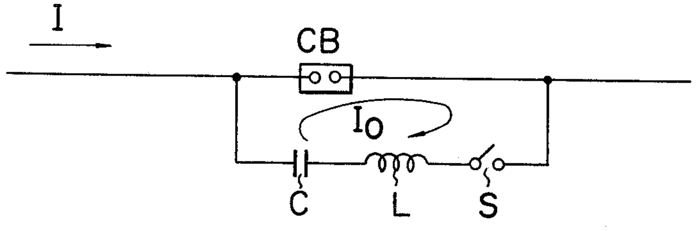
F I G. 1 PRIOR ART
FIG. 1 is a connection diagram showing one example of a prior art DC interrupting apparatus provided with an arc extinguishing circuit.
Figure 2:
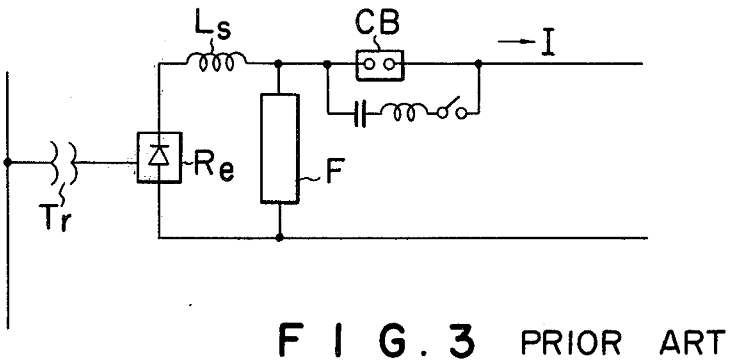
F I G. 2 PRIOR ART
FIG. 2 is a connection diagram showing one end of a DC transmission line utilizing the DC interrupting apparatus shown in FIG. 1.
Figure 3:
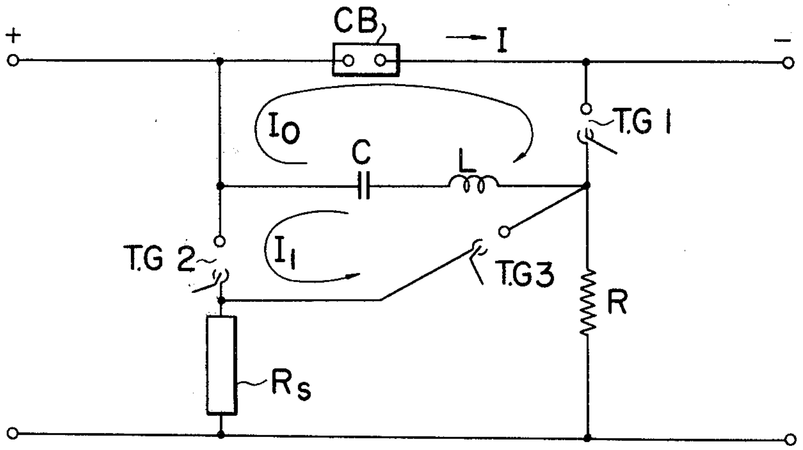
F I G. 3 PRIOR ART
FIGS. 3 and 4 are connection diagrams showing other examples of prior art DC circuit interrupting apparatus.
Figure 4:
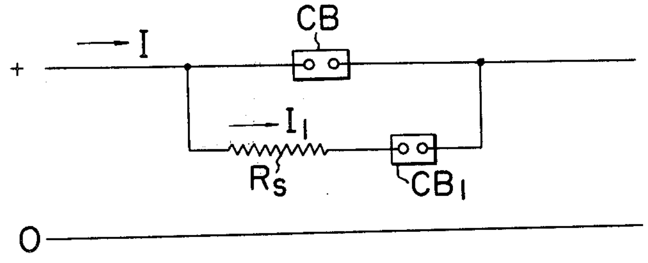
FIG. 4 PRIOR ART
Figure 5:
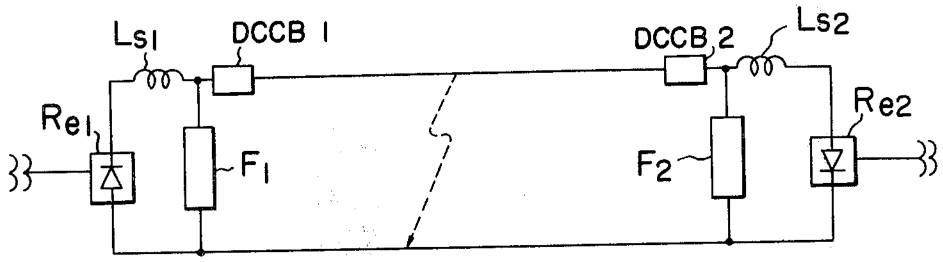
FIG. 5 PRIOR ART
FIG. 5 shows a connection diagram of a DC transmission line.

When short circuit or other abnormal condition occurs in the DC transmission line, the circuit interruptor CB is opened and at the same time the trigger gap TG is caused to discharge. Then the arc of the circuit interruptor CB is extinguished by the oscillatory discharge current $I_o$ in a manner as has been described above. Due to the energy stored in the smoothing reactor, a steep recovering voltage larger than the critical voltage $E_o$ is applied across the nonlinear resistor whereby the current I is transferred to the nonlinear resistor $R_N$. More particularly, in a DC transmission system as shown in FIG. 5, after the energy stored in the smoothing reactors $LS_1$ and $LS_2$, that is $\frac{1}{2}LS_1T^2+\frac{1}{2}LS_2I^2$, has been dissipated by the nonlinear resistor $R_N$ the current flowing through this resistor decreases to a small value. Then, current equal to the sum of this small value and the current flowing through the charging circuit flows through the trigger gap TG. Such small sum current can readily be cleared by the trigger gap, and the DC circuit is completely interrupted.

The above description refers to a through fault but in the case of an internal fault as shown by a dotted line in FIG. 5, the energy that is consumed by the nonlinear resistor is the energy stored in the smoothing reactor $LS_1$ and the current that is required to be interrupted is the residual current of the nonlinear resistor.

Since the current required to be interrupted by the trigger gap is small, of the order of 1 ampere, a simple mechanical switch can be substituted for the trigger gap.

In the DC circuit interrupting apparatus described above as the resistance value of the nonlinear resistor decreases, the voltage across it when the current to be interrupted is transferred thereto is small. This is desirable because it is possible to limit the excess voltage of the DC transmission system. However when the resistance value of the nonlinear resistor is small, the current normally flowing therethrough from the capacitor becomes excessive thus thermally damaging the nonlinear resistor.

Figure 8:
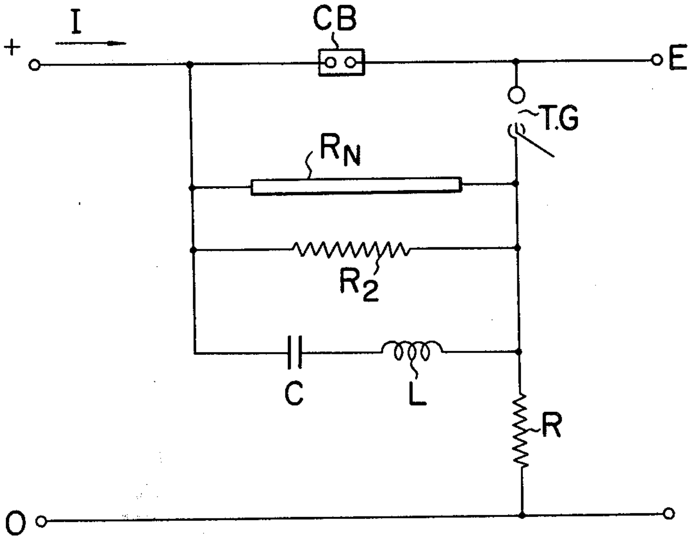
FIGS. 8, 9 and 10 are connection diagrams showing modified embodiments of this invention.

In a modified embodiment shown in FIG. 8, a resistor $R_2$ is connected in parallel with a nonlinear resistor $R_N$. By selecting the value of resistor $R_2$ to be smaller one order of magnitude than that of the nonlinear resistor it is possible to share the DC voltage among resistors R and $R_2$. If $R=R_2$, only one half of the DC voltage is applied across the nonlinear resistor thus decreasing the current normally flowing through it. In other words, it is possible to decrease the resistance value of the nonlinear resistor under normal voltage.

Figure 9:
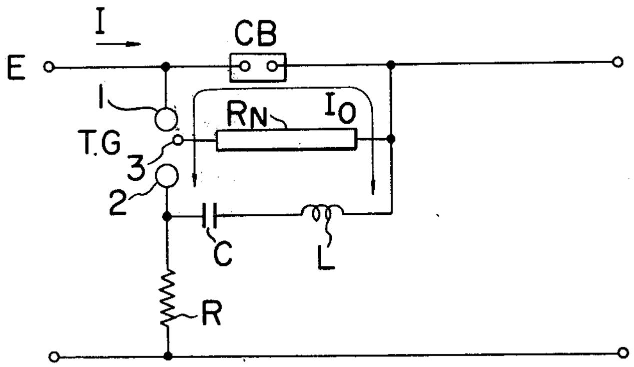

In the case shown in FIG. 9, trigger gap TG comprises spaced main discharge electrodes 1 and 2 and a trigger electrode 3 located close to the main electrode 1 which is connected to the line. In this case, one terminal of the nonlinear resistor $R_N$ is connected to the trigger electrode 3 so that this electrode is operated by the recovering voltage across circuit interruptor CB. It will be clear that this embodiment operates in the same manner as that shown in FIG. 6 but is advantageous in that it is not necessary to provide a source of pulse current to operate the trigger electrode 3.

Figure 10:
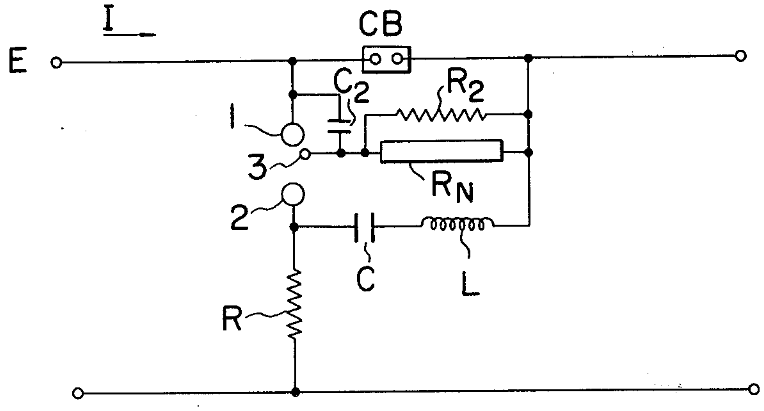

In another modification shown in FIG. 10, a resistor $R_2$ is connected in parallel with the nonlinear resistor $R_N$ and a capacitor $C_2$ is connected across the main discharge electrode 1 and the trigger electrode 3. With this arrangement, most of the arc voltage is impressed across the main electrode 1 and the trigger electrode 3 so that a large spark can be created therebetween thus ensuring prompt operation of the trigger gap.

In the various embodiments described above, it is possible to substitute a nonlinear resistor for the capacitor charging resistor R or to connect a nonlinear resistor in parallel with the resistor R.

We claim:

1. In a direct current circuit interrupting apparatus of the type comprising a circuit interruptor, an oscillation circuit including a capacitor and a reactor, switch means for connecting said oscillation circuit across said circuit interruptor when the latter is opened, and a first resistor for charging said capacitor, the improvement which comprises a nonlinear resistor and a second resistor connected in parallel with each other and with said oscillation circuit when said switch is closed, said nonlinear resistor comprising a sintered mixture of metal oxides.

2. The direct current circuit interrupting apparatus according to claim 1 wherein said metal oxides are selected from the group consisting of ZnO, MgO, CoO, NiO, $Sb_2O_3$ and $Bi_2O_3$.

3. The direct current circuit interrupting apparatus according to claim 1 wherein said switch means comprises a trigger gap including a pair of spaced gap electrodes and a trigger electrode adapted to strike an electric arc between the same and one of said gap electrodes.

4. The direct current circuit interrupting apparatus according to claim 1 wherein said switch means comprises a mechanical switch.

5. The direct current circuit interrupting apparatus according to claim 1 wherein the value of said second resistor is smaller by one order of magnitude than the value of said nonlinear resistor.

6. The direct current circuit interrupting apparatus according to claim 1 wherein said capacitor and reactor are connected in series.

7. The direct current circuit interrupting apparatus according to claim 3 wherein said trigger gap is connected between said first resistor and one side of said circuit interruptor.

8. The direct current circuit interrupting apparatus according to claim 3 wherein said trigger electrode is connected to said nonlinear resistor.

9. The direct current circuit interrupting apparatus according to claim 3 wherein a second capacitor is connected between a trigger gap electrode and said trigger electrode.

* * * * *